United States Patent
Abusalem et al.

(10) Patent No.: US 11,981,220 B2
(45) Date of Patent: May 14, 2024

(54) SELF-POWERED UNMANNED AERIAL VEHICLE (UAV)

(71) Applicant: Saudi Arabian Oil Company, Dhahran (SA)

(72) Inventors: Khaled F. Abusalem, Dhahran (SA); Soliman A. Al-Walaie, Dhahran (SA); Osama Bakur Bahwal, Dhahran (SA); Hadeel Algallaf, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 374 days.

(21) Appl. No.: 17/326,031

(22) Filed: May 20, 2021

(65) Prior Publication Data

US 2022/0371455 A1 Nov. 24, 2022

(51) Int. Cl.
*B60L 53/122* (2019.01)
*B60L 50/60* (2019.01)
(Continued)

(52) U.S. Cl.
CPC ............ *B60L 53/122* (2019.02); *B60L 50/60* (2019.02); *B64C 39/024* (2013.01); *B64D 27/24* (2013.01); *B64D 47/08* (2013.01); *H02J 7/0013* (2013.01); *H02J 7/02* (2013.01); *H02J 50/10* (2016.02); *H02J 50/80* (2016.02); *H02J 50/90* (2016.02); *B60L 2200/10* (2013.01);
(Continued)

(58) Field of Classification Search
CPC .... B60L 53/122; B60L 2220/10; H02J 50/10; B64U 50/35
See application file for complete search history.

(56) References Cited

U.S. PATENT DOCUMENTS 9,192,798 B2  11/2015  Dunster et al.
9,421,869 B1*  8/2016  Ananthanarayanan ...................... B60L 53/38
(Continued)

FOREIGN PATENT DOCUMENTS

CN  206099476  4/2017
CN  206657245  11/2017
(Continued)

OTHER PUBLICATIONS

SAIP Examination Report in SAIP Appln. No. 122431075, dated Jun. 17, 2023, 17 pages, with English Translation.
(Continued)

*Primary Examiner* — Christopher P Ellis
(74) *Attorney, Agent, or Firm* — Fish & Richardson P.C.

(57) ABSTRACT

The present disclosure describes a system that includes: an unmanned aerial vehicle (UAV) comprising one or more on-board batteries, and a self-powering payload coupled to the UAV, wherein the self-powering payload comprises: one or more transformable devices configured to alter an orientation of the one or more transformable devices with respect to a transmission line in proximity to the UAV when the UAV is air-borne; one or more coil devices mounted on the one or more transformable devices and configured to capture a magnetic flux of an electromagnetic field generated by the transmission line; and an electric circuit configured to generate, based on the captured magnetic flux, charging currents for the one or more on-board batteries on the UAV while the UAV is in air-borne.

15 Claims, 6 Drawing Sheets

(51) Int. Cl.
*B64C 39/02* (2023.01)
*B64D 27/24* (2006.01)
*B64D 47/08* (2006.01)
*B64U 50/34* (2023.01)
*H02J 7/00* (2006.01)
*H02J 7/02* (2016.01)
*H02J 50/10* (2016.01)
*H02J 50/80* (2016.01)
*H02J 50/90* (2016.01)
*B64U 10/13* (2023.01)
*B64U 50/19* (2023.01)
*B64U 101/30* (2023.01)

(52) U.S. Cl.
CPC .............. *B64U 10/13* (2023.01); *B64U 50/19* (2023.01); *B64U 50/34* (2023.01); *B64U 2101/30* (2023.01)

(56) References Cited

U.S. PATENT DOCUMENTS

| | | | |
|---|---|---|---|
| 9,440,102 | B2 | 9/2016 | Fernstrum et al. |
| 9,878,787 | B2 | 1/2018 | Chan et al. |
| 10,070,026 | B2 * | 9/2018 | Tian .................. H05K 5/03 |
| 10,099,561 | B1 * | 10/2018 | Ananthanarayanan ..................... B60L 53/32 |
| 10,374,483 | B1 * | 8/2019 | Dai .................... F16M 11/2064 |
| 10,418,853 | B2 * | 9/2019 | Yang ..................... B64C 25/52 |
| 10,919,626 | B2 * | 2/2021 | Jaugilas ................ H02J 50/001 |
| 11,059,378 | B2 * | 7/2021 | Jaugilas ................ B64U 10/25 |
| 11,358,717 | B2 * | 6/2022 | Wabnegger .......... H05K 9/0007 |
| 11,548,626 | B2 * | 1/2023 | Griffin ................. B64C 27/001 |
| 11,641,591 | B2 * | 5/2023 | Che ...................... H04W 24/10 455/67.11 |
| 11,738,651 | B2 * | 8/2023 | Beranger ................ B60L 53/34 320/108 |
| 2008/0017393 | A1 | 1/2008 | Whitney |
| 2011/0155397 | A1 | 6/2011 | Icove et al. |
| 2016/0354626 | A1 | 12/2016 | Mcnamera et al. |
| 2017/0015414 | A1 | 1/2017 | Chan et al. |
| 2017/0015415 | A1 | 1/2017 | Chan et al. |
| 2017/0227162 | A1 * | 8/2017 | Saika .................. F16M 11/121 |
| 2018/0246394 | A1 * | 8/2018 | Zhang ................. H02K 1/2795 |

FOREIGN PATENT DOCUMENTS

| | | | | |
|---|---|---|---|---|
| EP | 1534394 | | 6/2005 | |
| EP | 1912015 | A2 * | 4/2008 | .......... F16M 11/041 |
| EP | 2341387 | A1 * | 7/2011 | .......... F16M 11/126 |
| EP | 3486179 | B1 * | 8/2022 | .......... B64C 39/024 |

OTHER PUBLICATIONS

Akronbrass.com, [online], "3486 StreamMaster II with AVM 2000 GPM (7600 LPM)," available on or before 2019, retrieved on Feb. 6, 2020, retrieved from URL <https://www.akronbrass.com/monitors/stream-master-ii-with-avm>, 3 pages.

Angus Fire, "Firefighting Monitors," available on or before Dec. 1, 2019, retrieved on Feb. 6, 2020, retrieved from URL <https://angusfire.co.uk/wp-content/uploads/Monitors-8pp-Brochure-RS.pdf>, 8 pages.

Crdsolution.com, [online], "Automatic Fire Water Monitor," available on or before 2016, retrieved on Feb. 6, 2020 retrieved from URL <cfdsolution.com/automatic-fire-water-monitor/>, 2 pages.

Horell, "Testing the waters: a new challenge for the wireless power lab drone," Imperial College London, Jun. 2019, 6 pages.

Junaid et al., "Autonomous Wireless Self-Charging for Multi-Rotor Unmanned Aerial Vehicles," Energies, 2017, 10(803), 14 pages.

Loughran, "Wirelessly Powered Drone Enables Indefinite Flight Time," E&T, Engineering and Technology, Oct. 20, 2016, retrieved on Jul. 19, 2021, retrieved from URL <https://eandt.theiet.org/content/articles/2016/10/wirelessly-powered-drone-enables-indefinite-flight-time/>, 6 pages.

Rasi et al., "New Method for Data Communication over Power-Line Career," International Journal of Advanced Biotechnology and Research (IJBR), Jul. 2016, 7(5):993-1002, 11 pages.

* cited by examiner

SELF-POWERED UNMANNED AERIAL VEHICLE (UAV)

TECHNICAL FIELD

This disclosure generally relates to the application of unmanned aerial vehicle (UAV) for managing an industrial site.

BACKGROUND

The oil and gas industry has been utilizing UAV in daily operations of its production sites. For example, UAVs can be used for aerial inspection and surveillance, and emergency response applications.

SUMMARY

In one aspect, some implementations provide a system that includes: an unmanned aerial vehicle (UAV) comprising one or more on-board batteries, and a self-powering payload coupled to the UAV, wherein the self-powering payload includes: one or more transformable devices configured to alter an orientation of the one or more transformable devices with respect to a transmission line in proximity to the UAV when the UAV is air-borne; one or more coil devices mounted on the one or more transformable devices and configured to capture a magnetic flux of an electromagnetic field generated by the transmission line; and an electric circuit configured to generate, based on the captured magnetic flux, charging currents for the one or more on-board batteries on the UAV while the UAV is in air-borne.

Implementations may include one or more of the following features.

The one or more transformable devices may include a set of gimbal devices, each rotatable about a respective axis. The set of gimbal devices may be rotatable about axes that are orthogonal to each other such that an orientation of one gimbal device from the set of gimbal devices can be altered to substantially increase the captured magnetic flux of the electromagnetic field. The set of gimbal devices may be rotatable without affecting a center of gravity of the system or causing drag to the UAV.

The UAV may further include a camera device configured to inspect a surrounding of the UAV while the UAV is air borne. The system may further include an antenna configured to wirelessly transmit and receive signals to wireless access points on transmission towers along the transmission line. The signals may include (i) first signals that encode command and control data from a control device of a UAV operator, and (ii) second signals that encode data obtained by the UAV.

The system may further include a processor coupled to one or more sensors on the self-powering payload and the UAV, wherein the processor may be configured to perform operations of: based on measurement data from the one or more sensors, determining the orientation of the one or more transformable devices with respect to the transmission line; and controlling a position of at least one of the one or more transformable devices such that the orientation of the one or more transformable devices with respect to the transmission line is adjusted. The operations may further include: prior to controlling the position of the at least one of the one or more transformable devices, computing a desired position for the one or more transformable devices. The operations of said determining, said computing, and said controlling may be performed iteratively while the UAV is air borne.

In another aspect, some implementations may provide a computer-implemented method for controlling and operating a system that comprises an UAV and a self-powering payload, the computer-implemented method including: receiving measurement data from one or more sensors on the system; determining, based on the measurement data, an orientation of one or more transformable devices of the self-powering payload with respect to a transmission line in proximity to the UAV while the UAV is air-borne; and controlling a position of at least one of one or more transformable devices of the self-powering payload such that the orientation of the one or more transformable devices with respect to the transmission line is adjusted while the UAV is air borne.

The implementations may include one of more of the following features.

The method may further include, prior to controlling the position of the at least one of the one or more transformable devices, computing a desired position for the one or more transformable devices. Said determining, said computing, and said controlling may be performed iteratively while the UAV is air borne.

The system may further comprise an antenna configured to wirelessly transmit and receive signals to wireless access points on transmission towers along the transmission line. The signals may include (i) first signals that encode command and control data from a control device of a UAV operator, and (ii) second signals that encode data obtained by the UAV.

The one or more sensors may include a camera device configured to inspect a surrounding of the UAV while the UAV is air borne. The self-powering payload may be coupled to the UAV and include: one or more transformable devices configured to alter an orientation of the one or more transformable devices with respect to the transmission line in proximity to the UAV when the UAV is air-borne; one or more coil devices mounted on the one or more transformable devices and configured to capture a magnetic flux of an electromagnetic field generated by the transmission line; and an electric circuit configured to generate, based on the captured magnetic flux, charging currents for one or more on-board batteries on the UAV while the UAV is in air-borne.

The one or more transformable devices may comprise a set of gimbal devices, each rotatable about a respective axis. The set of gimbal devices may be rotatable about axes that are orthogonal to each other such that an orientation of one gimbal device from the set of gimbal devices can be altered to substantially increase the captured magnetic flux of the electromagnetic field. The set of gimbal devices may be rotatable without affecting a center of gravity of the system or causing drag to the UAV.

In yet another aspect, some implementations provide a self-powering payload coupled to an UAV, wherein the self-powering payload comprises: one or more transformable devices configured to alter an orientation of the one or more transformable devices with respect to a transmission line in proximity to the UAV when the UAV is air-borne; one or more coil devices mounted on the one or more transformable devices and configured to capture a magnetic flux of an electromagnetic field generated by the transmission line; and an electric circuit configured to generate, based on the captured magnetic flux, charging currents for the one or more on-board batteries on the UAV while the UAV is in air-borne.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

BRIEF DESCRIPTION OF DRAWINGS

Like reference numbers and designations in the various drawings indicate like elements.

DETAILED DESCRIPTION

Figure 1:
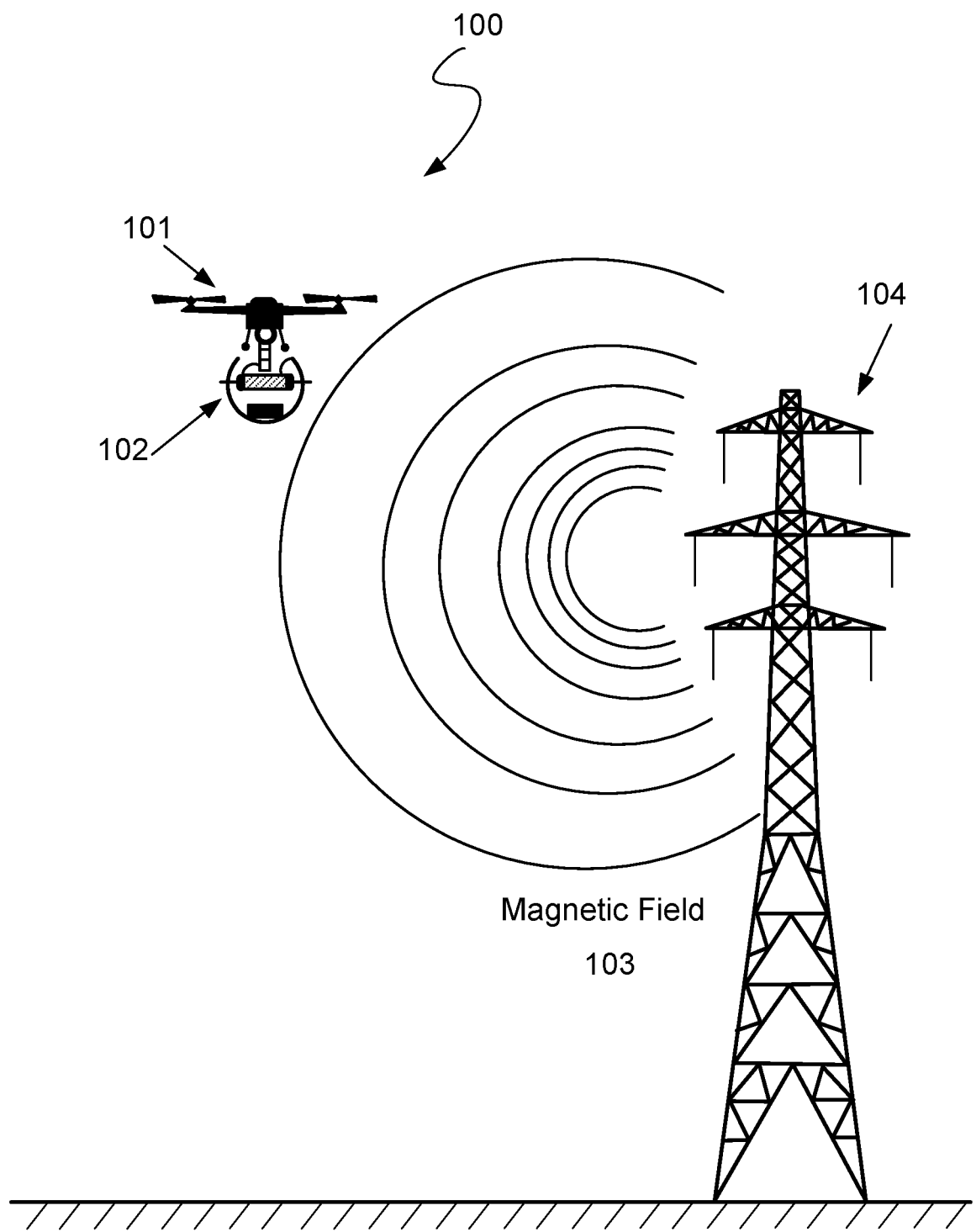
FIG. 1 illustrates an example of charging an UAV based on a self-powering payload according to an implementation of the present disclosure.

The disclosed technology is directed to system and method for extending the endurance of electric unmanned aerial vehicles (UAVs), for example, vertical takeoff and landing (VTOL) vehicles. Some implementations incorporate a charging mechanism when the UAV is inspecting power transmission lines. These implementations may utilize the electromagnetic field generated from the alternating current carried by these high-voltage transmission lines. In some cases, these high-voltage transmission system can operate at 230 kilovolts (kV) to transmit electric power from power plants through thousands of kilometers of electrical conductors. In one example, the UAV can be equipped with a self-powering payload that incorporates coils to capture the magnetic flux from the electromagnetic field and convert the captured magnetic flux to an electromotive force (EMF) voltage. In this example, the generated EMF voltage can continuously power the UAV and charge the battery concurrently while the UAV is air borne, thereby increasing the flight endurance time. Such implementations can overcome the travel time limitation of conventional configurations. Moreover, some implementations may utilize the high-voltage transmission lines to remotely communicate control and data signals to the UAV, thereby extending the flight range up to hundreds of kilometers.

The terminology used in the present disclosure includes the following terms.

The term "machine learning analytics" refers to the use of machine learning and applied statistics to predict unknown conditions based on the available data. Two general areas that fall under machine learning analytics are classification and regression. While classification refers to the prediction of categorical values, regression connotes the prediction of continuous numerical values. One machine learning implementation is also known as "supervised learning" where the "correct" target or y values are available. For illustration, the goal of some implementations is to learn from the available data to predict the unknown values with some defined error metrics. In supervised learning, for example, there are a set of known predictors (features) $x_1, x_2, \ldots, x_m$ which are known to the system as well as the target values $y_1, y_2, \ldots, y_n$, which are to be inferred. The system's objective is to train a machine learning model to predict new target values $y_1, y_2, \ldots, y_n$ by observing new features.

The implementations can employ a variety of machine learning algorithms. For classification, examples of prediction algorithms can include, logistic regression, decision trees, nearest neighbor, support vector machines, K-means clustering, boosting, and neural networks. For regression, examples of predication algorithms can include least squares regression, Lasso, and others. The performance of an algorithm can depend on a number factors, such as the selected set of features, training/validation method and hyper-parameters tuning. As such, machine learning analytics can manifest as an iterative approach of knowledge finding that includes trial and error. An iterative approach can iteratively modify data preprocessing and model parameters until the result achieves the desired properties.

FIG. 1 shows a diagram 100 illustrates an example of charging an UAV 101 based on a self-powering payload 102 according to an implementation of the present disclosure. As illustrated, UAV 101 can be a quadcopter drone with vertical takeoff and landing (VTOL) capabilities. In this illustration, UAV 101 is flying nearby a high voltage transmission line that spans over numerous transmission towers including transmission tower 104. While UAV 101 is inspecting industrial site along the high-voltage transmission line to maintain the daily operation of an industrial site, UAV 101 can be immersed in the magnetic field 103 emitting from the alternating current carried by the high-voltage transmission line. In some implementations, the self-powering payload 102 can be adapted to capture the magnetic flux from the magnetic field 103 and provide charging current to on-board battery so that UAV 101 can be wirelessly charged while air borne.

Figure 2:
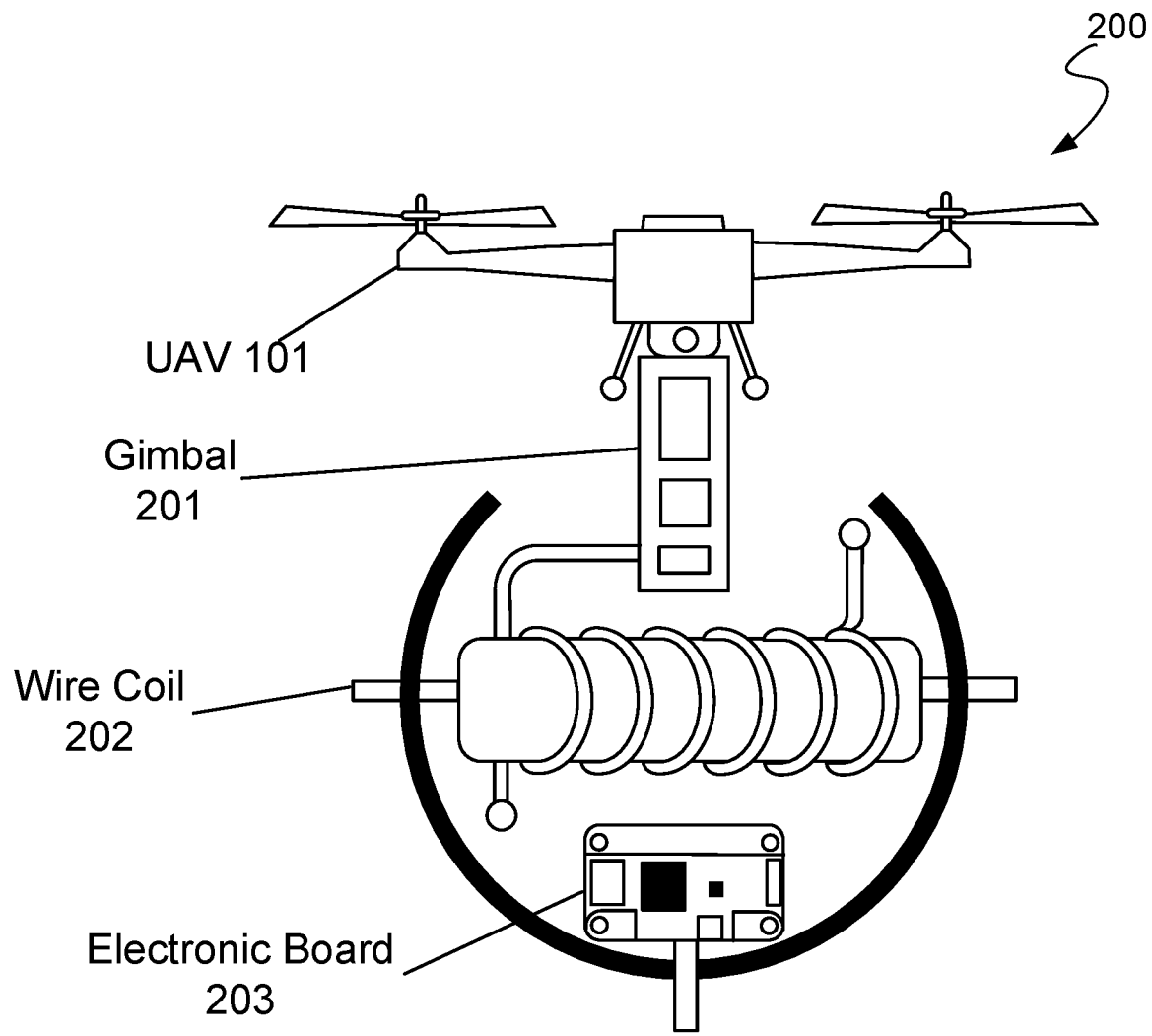
FIG. 2 illustrates an example of the self-powering payload integrated with the UAV according to an implementation of the present disclosure.

FIG. 2 illustrates the operating principle of some implementations. As illustrated in diagram 200, the self-powering payload can be mounted via gimbal 201 to utilize electromagnetic induction for wirelessly charging an on-board battery of UAV 101. Gimbal 201 can include a set of gimbals each providing a pivoted support that permits rotation of the payload about an axis. In some cases, electro-mechanical gyroscope can also be used to provide the pivoted support for the mounted self-powering payload. In this illustration, the self-powering payload includes a coil 202 and an electric board 203. Coil 202 and electric board 203 can take various configurations and forms. Once mounted on gimbal 201 (or electro-mechanical gyroscope), the orientation of coil 202 can be adjusted to improve the penetrating magnetic flux, and thus the resultant EMF. For example, the normal vector of the coil's plane can be aligned with the magnetic flux to potentially fully capture the magnetic flux. While some implementations incorporate a self-powering payload that is custom built for UAV 101, in other implementations, the self-powering payload can be a stand-alone component capable of being integrated into, for example, a commercially available UAV.

In one illustration, a payload of wound coil of wires, composed of N turns, each with the same $\Phi B$, Faraday's law of induction states that: $EMF=-N (\Delta\phi/\Delta t)$. Here, N is the number of turns of wire and $\Phi B$ is the magnetic flux through a single loop and can be extracted from the magnetic field curves. In some cases, N can be 300. Notably, N can be further adjusted to a larger number depending on, for example, a balance between weight and power desired. Based on the above considerations, to generate a power level that makes up the average consumption of 800 mA and voltage of 12V, the radius of the coil can be about 30 cm. In other words, to continuously charge an UAV, coils with a 30 cm radius may be needed. If these cases, if the payload is mounted underneath the UAV, the configuration may result in a payload that extends 70 cm (including a diameter of 60 cm and a 10 cm clearance) beneath the UAV. Once the payload dimension becomes larger than the dimension of the UAV itself, the payload may cause air drag when the UAV is airborne. Moreover, the configuration may shift the center of gravity during flight. In other words, the configuration may cause offset loads, which may negatively impact the stability and balance of the UAV while air borne. While the payload includes moving parts to potentially optimize the capturing of the magnetic flux, the under-mount configuration may lead to changing of mass-inertia parameters that can destabilize the UAV.

Figure 3A:
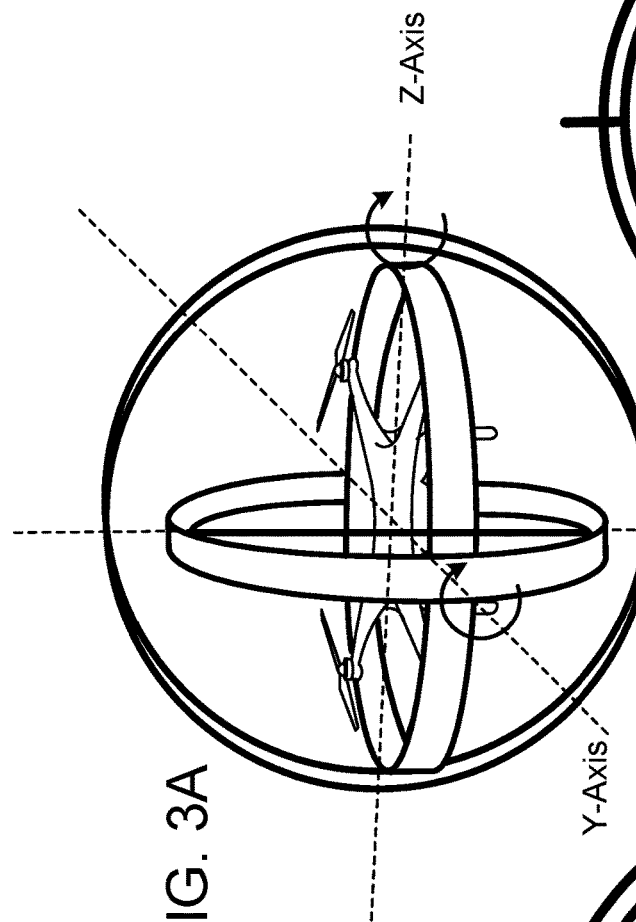
FIGS. 3A to 3C illustrate three views of another example of the self-powering load integrated with the UAV according to an implementation of the present disclosure.
Figure 3C:
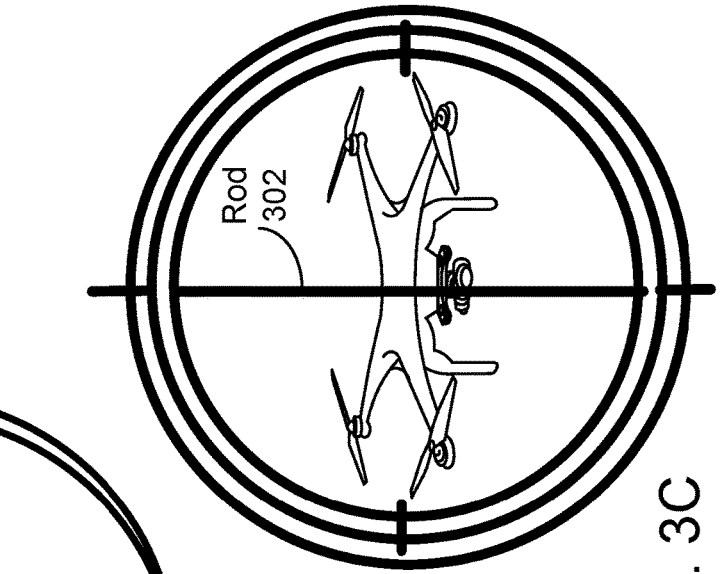
Figure 3B:
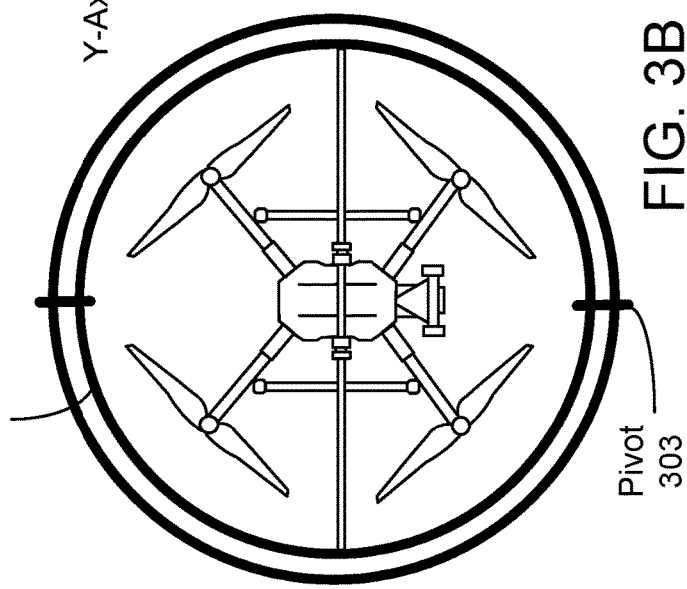

Some implementations can provide a UAV with the self-powering payload mounted on a three-axis gimbal device according to an implementation of the present disclosure. Referring to FIGS. 3A, 3B, and 3C, each figure shows a view of UAV configuration 300. Specifically, FIG. 3A shows a perspective view, FIG. 3B shows a top view, and FIG. 3C shows a side view. As illustrated, configuration 300 includes a 3-axis gimbal that encloses the UAV. In other words, the self-powering payload is not mounted underneath the UAV.

In more detail, FIGS. 3A to 3C show a 3-axis gimbal that encompasses the UAV and includes a set of three gimbals arranged to pivot about three orthogonal axes. Each gimbal in the set of three gimbals can include a ring rotatable about one of the three orthogonal axes. Each ring offers a degree of freedom: roll, pitch, and yaw. When two gimbals from the set of three gimbals rotate around the same axis, the gimbal system can lose one degree of freedom. Each ring forms a closed loop and can include embedded coils 301 on the inner surface. The closed loop formation can be used to capture magnetic flux of the magnetic field resulting from alternating currents being carried on the high-voltage transmission line. The coil may include additional windings to potentially increase the area capable of receiving the magnetic flux. In this illustrations, the outer most ring includes pivot 303, which may indicate a point or axis for pivoting the ring. The illustration also shows rod 302, which may indicate that the inner most ring as vertically fixed.

Figure 4:
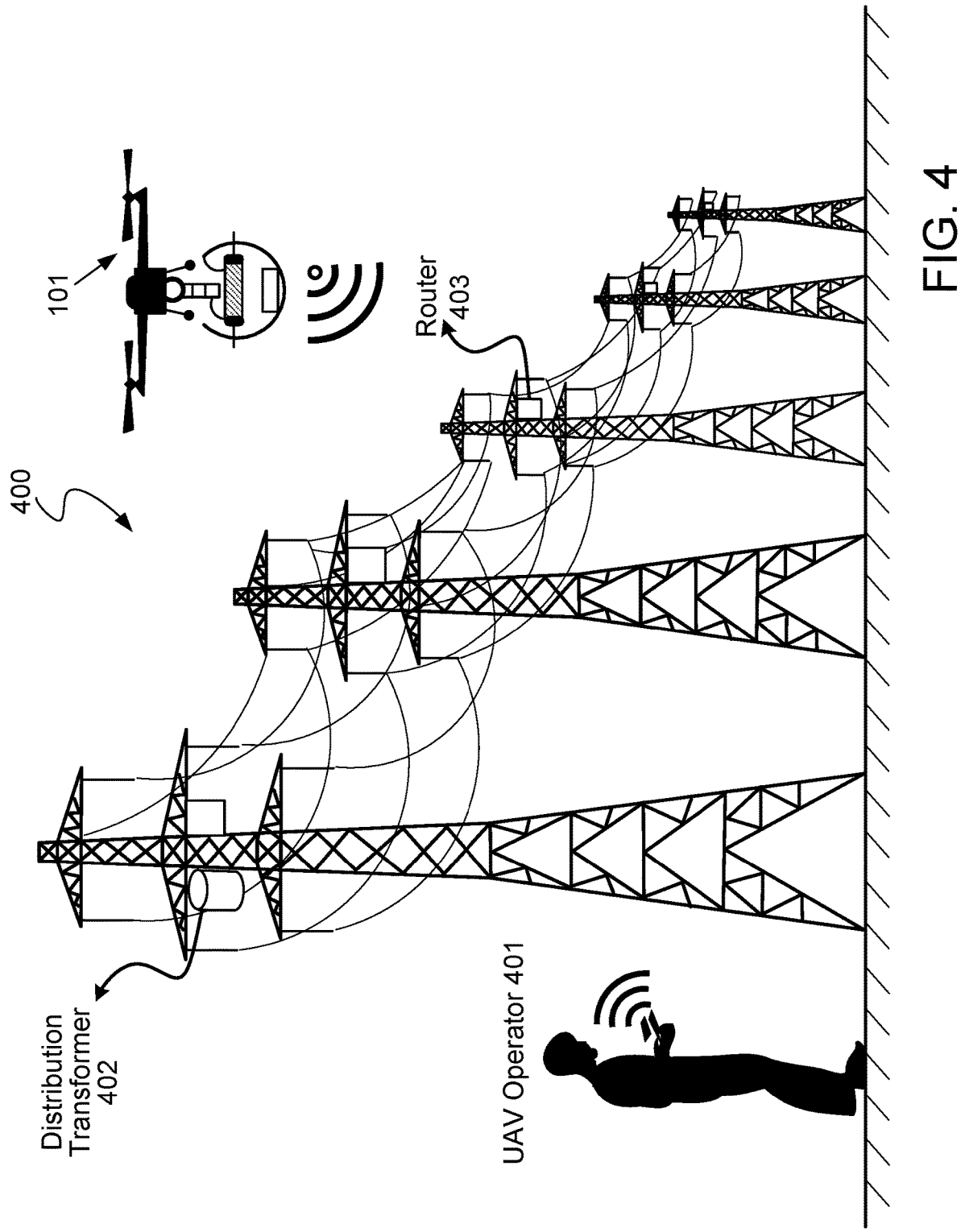
FIG. 4 illustrate an example of operating the UAV with a self-powering payload near power lines and utilizing broadband over power lines according to an implementation of the present disclosure.

FIG. 4 shows a diagram 400 in which a UAV operator may utilize high-voltage transmission lines to remotely communicate control and data signals to the UAV. The UAV operator 401 may operate a control device, such as a mobile computing device, in proximity to a transmission tower. As illustrated, each transmission tower may be mounted with a distribution transformer 402 and a router 403. The UAV operator may initiate a communication session with UAV 101 by opening a wireless connection with, for example, a router 403 on a nearby transmission tower. In some case, the router 403 may be a 5G device that includes an antenna. The router can be powered by the transmission tower. The routers on each transmission tower can relay the communication signals back and forth between the user device of the UAV operator and the UAV. In this manner, the communication range between the UAV operator and the UAV can be extended to hundreds of kilometers. In some cases, the communication can leverage broadband over power lines where a Wi-Fi routers will be placed evenly through the power lines to establish continuous radio coverage while UAV is flying between the transmission towers by following the transmission-line corridor.

As a result, UAV 101 in these cases can maintain air borne for hours of continuous operation while being charged wirelessly via inductive coupling with the electromagnetic field of the transmission lines. In addition, UAV 101 can be operated remotely from a long distance in the range of hundreds of kilometers. Indeed, by utilizing power lines as communication link, data and live video can be transmitted or received over the range of up to hundreds of kilometers.

Figure 5:
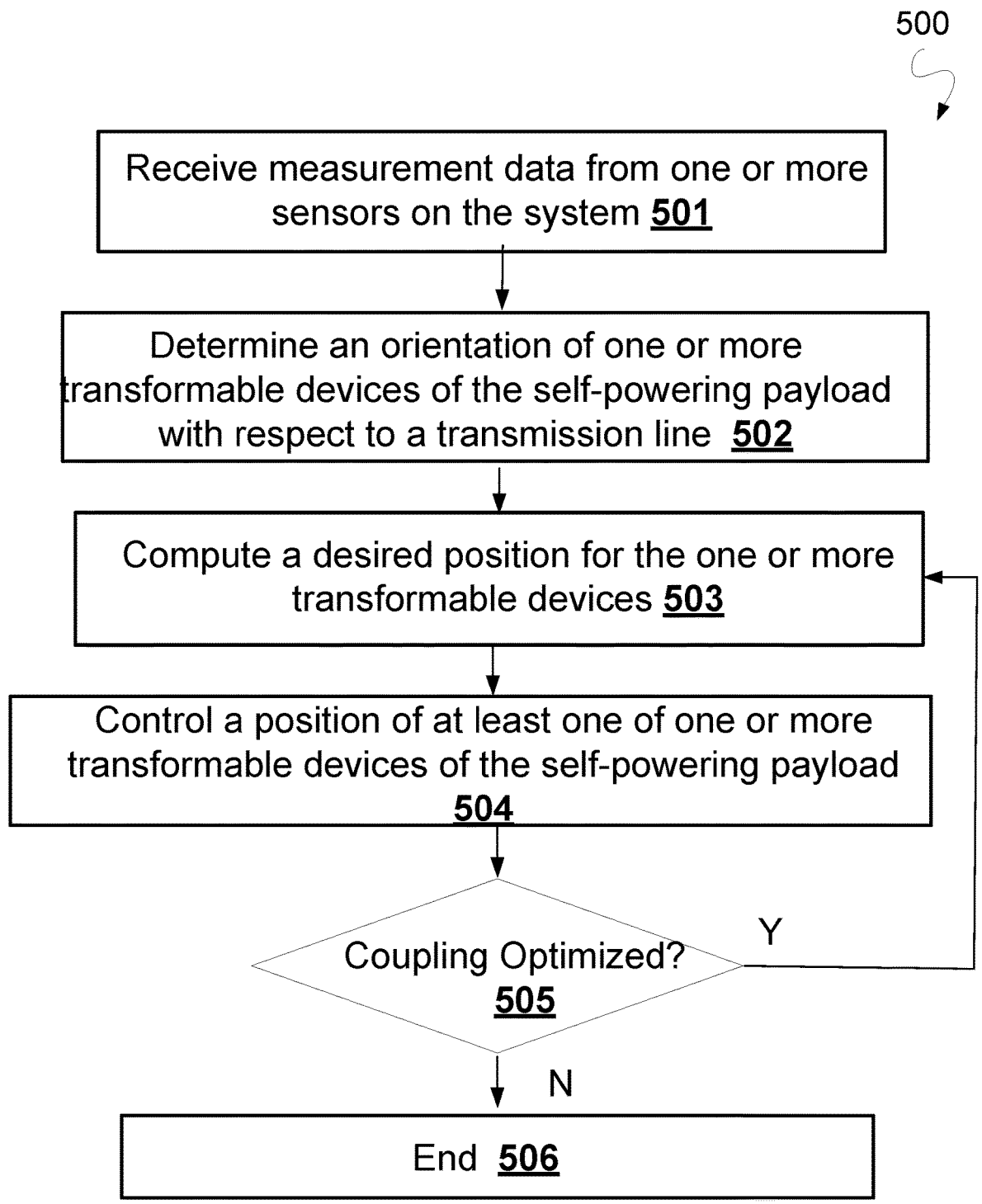
FIG. 5 illustrates an example of a flow chart according to an implementation of the present disclosure.

FIG. 5 illustrating an example of a flow chart 500 according to some implementations of the present disclosure. Some implementations incorporate a processor located on the system that includes UAV 101 and self-powering payload 102. The system may additionally include one or more sensors such as, for example, a camera device configured to record video information when the UAV is conducting surveillance or inspection of the industrial site. The sensors may also include an altimeter device to measure altitude, a speedometer device to measure speed, and a range meter to measure distance to an object. The processor may receive measurement data from one or more sensors on the system (501). The measurement data can particularly reveal a position of the system relative to, for example, a high-voltage transmission line when the UAV is flying in proximity to the transmission line.

Based on the measurement data, the processor may determine a relative position of the self-powering payload with respect to the transmission line (502). For example, the processor may determine an orientation of one or more transformable devices of the self-powering payload with respect to the transmission line. In some cases, the one or more transformable devices may include a set of gimbal devices or gyroscopic devices. By way of illustration, the set of gimbal devices can rotate about a set of orthogonal axes without affecting a center of gravity or causing air drag to the UAV that is air borne.

The processor may then compute a desired position of the one or more transformable devices of the self-powering payload (503). The computation may factor in not only the measured proximity relative to the transmission line, but also the flight path and altitude of the UAV. In various implementations, the processor may invoke a machine learning algorithm that can intelligently determine the desired position of the one or more transformable devices for catching the magnetic flux of the electromagnetic field generated by the transmission line. The machine learning analytics can employ predictive analytics to judiciously determine the desired position based on, for example, past data showing the best position when the UAV was operating under similar conditions.

The processor may then control the position of the one or more transformable devices of the self-powering payload (504). In some cases, the control may be asserted via command and control instructions to the self-powering payload. In some cases, the command and control instructions can be communicated over dedicated bus lines from the processor on the UAV to the transformable devices of the self-powering payload. In these cases, the communication may also involve firmware on the self-powering payload. Once the position of the one or more transformative devices is being changed, the orientation of the one or more transformable devices with respect to the transmission line can be adjusted. Such adjustment can be accomplished while the UAV is air borne.

In various implementations, determining the relative position of the self-powering payload with respect to the transmission line, computing a desired position of the one or more transformable devices of the self-powering payload, and controlling the position of the one or more transformable devices of the self-powering payload can be accomplished iteratively. For example, based on the controlling action, the processor may receive additional measurement data. Such additional measurement data can reveal whether the coupling between the self-powering payload and the transmission line has been improved (505). Some implementations may pursue optimization of the coupling to continuously monitor the measurement data and control the position of at least one of one or more transformable devices of the self-powering payload such that the orientation of the one or more transformable devices with respect to the transmission line is continuously adjusted while the UAV is air borne and in proximity to the transmission line. In these implementations, once the processor determines the coupling is not yet optimized, for example, when the coupling has not yielded a threshold level of charging rate, the processor may continue to compute an updated position for the one or more transformable devices and then adjust the position of the one or more transformable devices accordingly. Once the processor determines that the coupling has achieved a threshold level of charging rate, the processor may terminate the process (506).

Figure 6:
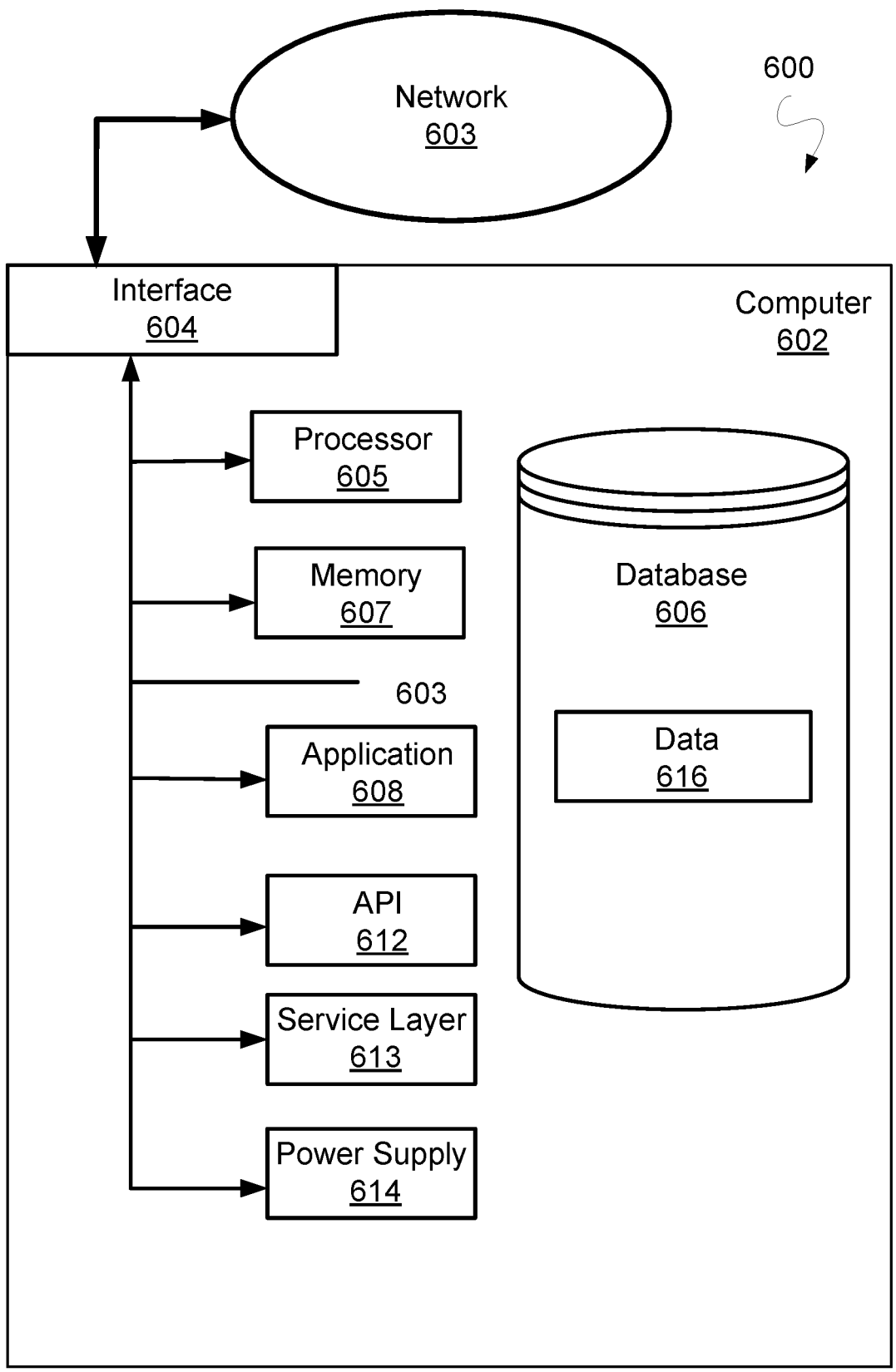
FIG. 6 is a block diagram illustrating an example of a computer system used to provide computational functionalities associated with described algorithms, methods, functions, processes, flows, and procedures, according to an implementation of the present disclosure.

FIG. 6 is a block diagram illustrating an example of a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a computer system as a client, network component, a server, a database or another persistency, another role, or a combination of roles for performing the subject matter described in the present disclosure. The illustrated computer 602 is communicably coupled with a network 603. In some implementations, one or more components of the computer 602 can be configured to operate within an environment, including cloud-computing-based, local, global, another environment, or a combination of environments.

The computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 603 (for example, from a client software application executing on another computer 602) and respond to the received requests by processing the received requests using a software application or a combination of software applications. In addition, requests can also be sent to the computer 602 from internal users, external or third-parties, or other entities, individuals, systems, or computers.

Each of the components of the computer 602 can communicate using a network 603. In some implementations, any or all of the components of the computer 602, including hardware, software, or a combination of hardware and software, can interface over the network 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 603 in a distributed environment. Generally, the interface 604 is operable to communicate with the network 603 and comprises logic encoded in software, hardware, or a combination of software and hardware. More specifically, the interface 604 can comprise software supporting one or more communication protocols associated with communications such that the network 603 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 603 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds the previously described data 616 including, for example, multiple streams of data from the sensors of the system, such as the camera device, the altimeter devices, the speedometer device, and the range device. The data may also include positional data of the one or more transformable device of the self-powering payload.

The computer 602 also includes a memory 607 that can hold data for the computer 602, another component or components communicatively linked to the network 603 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 603. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A system comprising:
   an unmanned aerial vehicle (UAV) comprising one or more on-board batteries, and
   a self-powering payload coupled to the UAV, wherein the self-powering payload comprises:
   one or more transformable devices comprising a set of gimbal devices configured to alter an orientation of the one or more transformable devices with respect to a transmission line in proximity to the UAV when the UAV is air-borne;
   one or more coil devices mounted on the one or more transformable devices and configured to capture a magnetic flux of an electromagnetic field generated by the transmission line; and
   an electric circuit configured to generate, based on the captured magnetic flux, charging currents for the one or more on-board batteries on the UAV while the UAV is in air-borne,
   wherein each gimble device is rotatable about a respective axis to alter the orientation of the one of more transformable devices, and
   wherein the respective axes are orthogonal to each other such that an orientation of one gimbal device from the set of gimbal devices can be altered to substantially increase the captured magnetic flux of the electromagnetic field without affecting a center of gravity of the system or causing drag to the UAV.

2. The system of claim 1, wherein the UAV further comprises a camera device configured to inspect a surrounding of the UAV while the UAV is air borne.

3. The system of claim 2, wherein the system further comprises an antenna configured to wirelessly transmit and receive signals to wireless access points on transmission towers along the transmission line.

4. The system of claim 3, wherein the signals include (i) first signals that encode command and control data from a control device of a UAV operator, and (ii) second signals that encode data obtained by the UAV.

5. The system of claim 1, wherein the system further comprises a processor coupled to one or more sensors on the self-powering payload and the UAV, wherein the processor is configured to perform operations of:
   based on measurement data from the one or more sensors, determining the orientation of the one or more transformable devices with respect to the transmission line; and
   controlling a position of at least one of the one or more transformable devices such that the orientation of the one or more transformable devices with respect to the transmission line is adjusted.

6. The system of claim 5, wherein the operations further comprise:
prior to controlling the position of the at least one of the one or more transformable devices, computing a desired position for the one or more transformable devices.

7. The system of claim 6, wherein the operations of said determining, said computing, and said controlling are performed iteratively while the UAV is air borne.

8. A computer-implemented method for controlling and operating a system that comprises an UAV and a self-powering payload, the computer-implemented method comprising:
receiving measurement data from one or more sensors on the system;
determining, based on the measurement data, an orientation of one or more transformable devices of the self-powering payload with respect to a transmission line in proximity to the UAV while the UAV is air-borne, wherein one or more coil devices are mounted on the one or more transformable devices and configured to capture a magnetic flux of an electromagnetic field generated by the transmission line; and
controlling a position of at least one of one or more transformable devices of the self-powering payload such that the orientation of the one or more transformable devices with respect to the transmission line is adjusted while the UAV is air borne,
wherein the one or more transformable devices comprise a set of gimbal devices each rotatable about a respective axis to alter the orientation of the one of more transformable devices,
wherein the respective axes are orthogonal to each other, and
wherein the orientation of the one or more transformable devices with respect to the transmission line is adjusted by adjusting an orientation of one gimbal device from the set of gimbal devices such that a captured magnetic flux of the electromagnetic field is substantially increased without affecting a center of gravity of the system or causing drag to the UAV.

9. The computer-implemented method of claim 8, further comprising:
prior to controlling the position of the at least one of the one or more transformable devices, computing a desired position for the one or more transformable devices.

10. The computer-implemented method of claim 9, wherein said determining, said computing, and said controlling are performed iteratively while the UAV is air borne.

11. The computer-implemented method of claim 8, wherein the system further comprises an antenna configured to wirelessly transmit and receive signals to wireless access points on transmission towers along the transmission line.

12. The computer-implemented method of claim 11, wherein the signals include (i) first signals that encode command and control data from a control device of a UAV operator, and (ii) second signals that encode data obtained by the UAV.

13. The computer-implemented method of claim 8, wherein the one or more sensors comprise a camera device configured to inspect a surrounding of the UAV while the UAV is air borne.

14. The computer-implemented method of claim 8, wherein the self-powering payload is coupled to the UAV and comprises:
the one or more transformable devices;
the one or more coil devices; and
an electric circuit configured to generate, based on the captured magnetic flux, charging currents for one or more on-board batteries on the UAV while the UAV is in air-borne.

15. A system comprising:
a self-powering payload coupled to an UAV,
wherein the self-powering payload comprises:
one or more transformable devices comprising a set of gimbal devices configured to alter an orientation of the one or more transformable devices with respect to a transmission line in proximity to the UAV when the UAV is air-borne;
one or more coil devices mounted on the one or more transformable devices and configured to capture a magnetic flux of an electromagnetic field generated by the transmission line; and
an electric circuit configured to generate, based on the captured magnetic flux, charging currents for one or more on-board batteries on the UAV while the UAV is in air-borne,
wherein each gimble device is rotatable about a respective axis to alter the orientation of the one of more transformable devices, and
wherein the respective axes are orthogonal to each other such that an orientation of one gimbal device from the set of gimbal devices can be altered to substantially increase the captured magnetic flux of the electromagnetic field without affecting a center of gravity of the system or causing drag to the UAV.

* * * * *